United States Patent
Satou et al.

(10) Patent No.: US 10,073,573 B2
(45) Date of Patent: Sep. 11, 2018

(54) CONDUCTIVE SHEET, CAPACITIVE TOUCH PANEL, DISPLAY DEVICE

(71) Applicant: FUJIFILM Corporation, Tokyo (JP)

(72) Inventors: Tasuku Satou, Ashigarakami-gun (JP); Tadashi Kuriki, Ashigarakami-gun (JP); Nobuyuki Tada, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 95 days.

(21) Appl. No.: 15/167,366

(22) Filed: May 27, 2016

(65) Prior Publication Data

US 2016/0274702 A1 Sep. 22, 2016

Related U.S. Application Data

(63) Continuation of application No. PCT/JP2014/076305, filed on Oct. 1, 2014.

(30) Foreign Application Priority Data

Dec. 3, 2013 (JP) ................................ 2013-250335

(51) Int. Cl.
*G06F 3/044* (2006.01)
(52) U.S. Cl.
CPC .... *G06F 3/044* (2013.01); *G06F 2203/04112* (2013.01)
(58) Field of Classification Search
CPC ....................... G06F 2203/04112; G06F 3/044
(Continued)

(56) References Cited

U.S. PATENT DOCUMENTS 9,715,305 B2* 7/2017 Miyamoto ............ G06F 3/0416
2011/0310037 A1 12/2011 Moran et al.
(Continued)

FOREIGN PATENT DOCUMENTS

| CN | 102334091 A | 1/2012 |
| JP | 2011-59772 A | 3/2011 |
| JP | 2012-243058 A | 12/2012 |

OTHER PUBLICATIONS

English translation of the Written Opinion of the International Searching Authority (Form PCT/ISA/237), dated Nov. 11, 2014, for International Application No. PCT/JP2014/076305.
(Continued)

*Primary Examiner* — Tony Davis
(74) *Attorney, Agent, or Firm* — Birch Stewart Kolasch & Birch, LLP

(57) ABSTRACT

In a conductive sheet having two metal meshes disposed to overlap each other, it is possible to increase the transmittance of the conductive sheet, to suppress moire generated between two electrodes, and to increase touch detection accuracy in a case where the conductive sheet is used in a touch panel. In a conductive sheet, a lower electrode and an upper electrode are disposed with a second sheet body (insulating layer) sandwiched therebetween. For example, the lower electrode has a mesh pattern formed by a plurality of linked second cells, and the upper electrode has a random mesh pattern including a plurality of first cells having different shapes. An average cell pitch Ps of the first cells is set to be greater than once and equal to or less than eight times an average cell pitch Pd of the second cells.

21 Claims, 9 Drawing Sheets

(58) Field of Classification Search
USPC .................................................. 345/170–176
See application file for complete search history.

(56) References Cited

U.S. PATENT DOCUMENTS

| | | | |
|---|---|---|---|
| 2012/0293430 A1 | 11/2012 | Kitada | |
| 2014/0139450 A1* | 5/2014 | Levesque | G08B 6/00 345/173 |
| 2014/0210749 A1* | 7/2014 | Park | G06F 3/044 345/173 |
| 2014/0347322 A1* | 11/2014 | Kamata | G06F 3/016 345/174 |
| 2016/0202764 A1* | 7/2016 | Kamata | G06F 3/04883 715/702 |
| 2016/0202837 A1* | 7/2016 | Miyamoto | G06F 3/0488 345/173 |
| 2016/0209923 A1* | 7/2016 | Miyamoto | G06F 3/016 |
| 2016/0246374 A1* | 8/2016 | Carter | G06F 3/016 |
| 2016/0266646 A1* | 9/2016 | Kamata | G06F 1/1643 |
| 2016/0320843 A1* | 11/2016 | Long | G06F 3/016 |
| 2016/0328019 A1* | 11/2016 | Taninaka | G06F 3/016 |
| 2016/0349846 A1* | 12/2016 | Sugiura | G06F 3/016 |

OTHER PUBLICATIONS

International Search Report for PCT/JP/2014/076305 (PCT/ISA/210) dated Nov. 11, 2014.
Written Opinion of the International Searching Authority for PCT/JP/2014/076305 (PCT/ISA/237) dated Nov. 11, 2014.
Chinese Office Action dated Mar. 30, 2018 for Application No. 201480062942.0, along with an English translation.

* cited by examiner

CONDUCTIVE SHEET, CAPACITIVE TOUCH PANEL, DISPLAY DEVICE

CROSS-REFERENCE TO RELATED APPLICATIONS

This application is a Continuation of PCT International Application No. PCT/JP2014/076305 filed on Oct. 1, 2014, which claims priority under 35 U.S.C § 119(a) to Japanese Patent Application No. 2013-250335 filed on Dec. 3, 2013. Each of the above applications is hereby expressly incorporated by reference, in its entirety, into the present application.

BACKGROUND OF THE INVENTION

1. Field of the Invention

The present invention relates to a conductive sheet, a capacitive touch panel, and a display device.

2. Description of the Related Art

As a display device of a multifunctional mobile phone (smartphone), a digital camera, or the like, a so-called touch panel on which various operations can be performed by touch with a finger has been widely used. In these devices, the display device has a small size, and recently, a touch panel has also been used in a large display device of a personal computer or the like. In particular, a mutual capacitive touch panel which can detect a plurality of places simultaneously (allows multi-touch) has become widespread.

In a touch panel, it is necessary that electrodes are made hard to be visually recognized by an operator and are excellent in conductivity. In a small touch panel, for example, indium-tin complex oxide (ITO) electrodes are used; however, in a case where ITO electrodes are used in a large touch panel, sufficient conductivity is not obtained and reduction in cost is difficult.

Accordingly, for example, as described in JP2011-059772A, electrodes which have a mesh pattern (mesh) with a plurality of linked cells formed by making thin metal wires intersect each other are used. In this case, since an opening is formed in each cell, the electrodes exhibit light transmittance, and for this reason, the electrodes are made hard to be visually recognized. There is also advantage in that the mesh made of metal wires is high in conductivity and can be provided at low cost.

As described in JP2012-243058A, for example, electrodes are laminated under and above an insulating layer, and accordingly, the lower electrode and the upper electrode are opposed to each other at a plurality of places through the insulating layer. Capacitance is generated between the respective opposing places, and if the touch panel is pressed with a finger, capacitance changes. A pressed point of the touch panel is detected from the amount of change at this time, and an issued operation command is determined.

JP2012-243058A also discloses that, in a touch panel using mesh electrodes, a cell pitch of an upper electrode (in JP2012-243058A, "reception electrode") is made greater than a cell pitch of a lower electrode (in JP2012-243058A, "transmission electrode"), thereby increasing detection accuracy.

SUMMARY OF THE INVENTION

In the conventional mutual capacitive touch panel using ITO, there is a case where the electrode width (a direction orthogonal to a longitudinal direction) of the lower electrode (an electrode far from a touch surface of a pair of electrodes of the touch panel) is made large, and the electrode width of the upper electrode (an electrode close to the touch surface of a pair of electrodes of the touch panel) is made small compared to the width of the lower electrode, thereby increasing touch detection accuracy. That is, since an electric field from the lower electrode passes through a place where the upper electrode is not formed, the width of the upper electrode is made small to increase the electric field which passes through the upper electrode.

In a case of decreasing the electrode width of the upper electrode having a metal mesh, it is necessary to decrease the average cell pitch of the mesh constituting the electrode with a decrease in the electrode width. However, in this case, there is a problem in that transmittance is lowered with a decrease in the opening area of the cell.

In order to decrease the width of the upper electrode, a case where the upper electrode is formed in a linear shape, instead of a mesh, is considered; however, in this case, if unintended disconnection occurs, since electrical conduction of the electrode is lost, there is a tendency to cause a problem of yield deterioration.

Accordingly, as described in JP2012-243058A, while increasing the cell pitch of the upper electrode to increase detection sensitivity has been considered, it is understood that there is a severe problem in that the difference in the cell pitch between the upper electrode and the lower electrode causes periodic interference (moire) between the two electrodes and the existence of the mesh is easily visually recognizable.

The invention has been accomplished in order to solve the above-described problems, and an object of the invention is to provide a conductive sheet, a capacitive touch panel, and a display device capable of increasing the transmittance of the conductive sheet having metal meshes, suppressing moire between an upper electrode and a lower electrode, and increasing touch detection accuracy.

The above-described object is attained by the configuration of [1] described below.

[1] A conductive sheet comprises a lower electrode and an upper electrode which are laminated with an insulating layer interposed therebetween. At least the lower electrode or the upper electrode has a first mesh electrode with a plurality of linked first cells formed by making metal wires intersect each other, the plurality of first cells being random cells having different shapes, and a plurality of first mesh electrodes extending in a first direction and being arranged in parallel in a second direction orthogonal to the first direction, the other electrode of the upper electrode and the lower electrode has a second mesh electrode with a plurality of linked second cells formed by making metal wires intersect each other, a plurality of second mesh electrodes extending in the second direction and being arranged in parallel in the first direction, and when the average cell pitch of the lower electrode is Pd and the average cell pitch of the upper electrode is Ps, Ps/Pd is greater than 1 and equal to or less than 8.

The cells of at least the lower electrode or the upper electrode are constituted of cells having a random shape. Furthermore, the average cell pitch Pd of the lower electrode and the average cell pitch Ps of the upper electrode are designed so as to have the relationship described above, whereby an electric field emitted from the lower electrode easily passes through the openings of the cells of the upper electrode. For this reason, it is possible to increase the amount of change in capacitance between before and after the press of the finger without decreasing the electrode width (the dimension in the direction orthogonal to the longitudinal direction) of the upper electrode. For this reason, touch detection accuracy is improved.

Since the upper electrode is formed of a mesh having a large average cell pitch, it is possible to increase the transmittance of the upper electrode. At this time, at least the upper electrode or the lower electrode uses a mesh made of cells having a random shape, whereby the occurrence of moire due to the difference between the average cell pitches of the upper electrode and the lower electrode is suppressed, and visibility is not deteriorated.

[2] It is more preferable that Ps/Pd is equal to or greater than 2 and equal to or less than 6. This is because the amount of change in capacitance at the time of touch detection is increased.

[3] It is preferable that an effective electrode area of the upper electrode is equal to or greater than 70% of an effective touch area of the second electrode. With this, since the effective area of the upper electrode increases, it is preferable since it is possible to decrease a resistance value of the upper electrode.

[4] When the electrode width of the lower electrode is Wd and the electrode of the upper electrode is Ws, Ws/Wd may be set to be equal to or greater than 0.5 and equal to or less than 1.5. It is preferable that Ws/Wd is equal to or greater than 0.8 and equal to or less than 1.2. Ws and Wd are set to values close to each other, whereby it is possible to approximate detection accuracy in a vertical direction and detection accuracy in a horizontal direction in the display device without performing correction. The electrode width indicates the dimension of the lower electrode and the upper electrode in the direction orthogonal to the longitudinal direction, and in a case where the width of each electrode varies, it is assumed that comparison is made with the average widths of the respective electrodes.

That is, in the invention, unlike the related art, it is not particularly necessary to make the electrode width Ws of the upper electrode smaller than the electrode width Wd of the lower electrode, and the electrode width Ws of the upper electrode may be equal to or greater than the electrode width Wd of the lower electrode. For this reason, the degree of freedom of design of the upper electrode is improved.

[5] A suitable example of the shape of the second cell is a diamond shape.

[6] The average cell pitch Pd of the lower electrode may be, for example, equal to or greater than 50 μm and equal to or less than 400 μm. In this case, the average cell pitch Ps of the upper electrode may be greater than 50 μm and equal to or less than 3,200 μm.

[7] It is preferable that the first mesh electrode having a random pattern is the upper electrode. Of course, in this case, the second mesh electrode having the second cells becomes the lower electrode.

[8] It is preferable that, at opposing places of the lower electrode and the upper electrode, the electrode width of at least the lower electrode or the upper electrode is set to be smaller than other parts (that is, parts other than the opposing places). For example, in a case where the pitch of the upper electrode is made greater than the pitch of the lower electrode and the width of the upper electrode is increased, the opposing area of the upper electrode and the lower electrode is increased. In this case, in order to adjust the opposing area, only the opposing portions are decreased in width, thereby adjusting parasitic capacitance. With this, it is possible to achieve improvement of a signal to noise ratio (S/N ratio).

[9] A disconnection portion in which at least the metal wires forming the first cells or the metal wires forming the second cells are disconnected is provided at a part of opposing places of the lower electrode and the upper electrode. As described above, in a case where the pitch of the upper electrode is made greater than the pitch of the lower electrode and the width of the upper electrode is increased, the opposing area of the upper electrode and the lower electrode is increased. Accordingly, the opposing area at the opposing places is designed to be decreased, thereby adjusting parasitic capacitance. With this, it is possible to achieve improvement of the S/N ratio.

[10] The invention is a capacitive touch panel having the conductive sheet configured as above.

[11] The invention is a display device having the above-described capacitive touch panel.

According to the invention, the average cell pitch of the upper electrode is made greater than the average cell pitch of the lower electrode, and the ratio between both average cell pitches is set to be greater than 1 and equal to or less than 8. In this configuration, since it is possible to increase the amount of change in capacitance between before and after the press of the finger, touch detection accuracy is improved, and transmittance is improved. Furthermore, since at least the lower electrode or the upper electrode has a mesh made of random cells, even if the ratio between the average cell pitches is any numerical value greater than 1 and equal to or less than 8, moire is sufficiently reduced.

DESCRIPTION OF THE PREFERRED EMBODIMENTS

Hereinafter, preferred embodiments of a conductive sheet and a capacitive touch panel according to the invention will be described in detail referring to the accompanying drawings, in relation to a display device comprising the conductive sheet and the capacitive touch panel. In this specification, "to" indicating a numerical value range is used to mean numerical values described before and after "to" as a lower limit value and an upper limit value.

Figure 1:
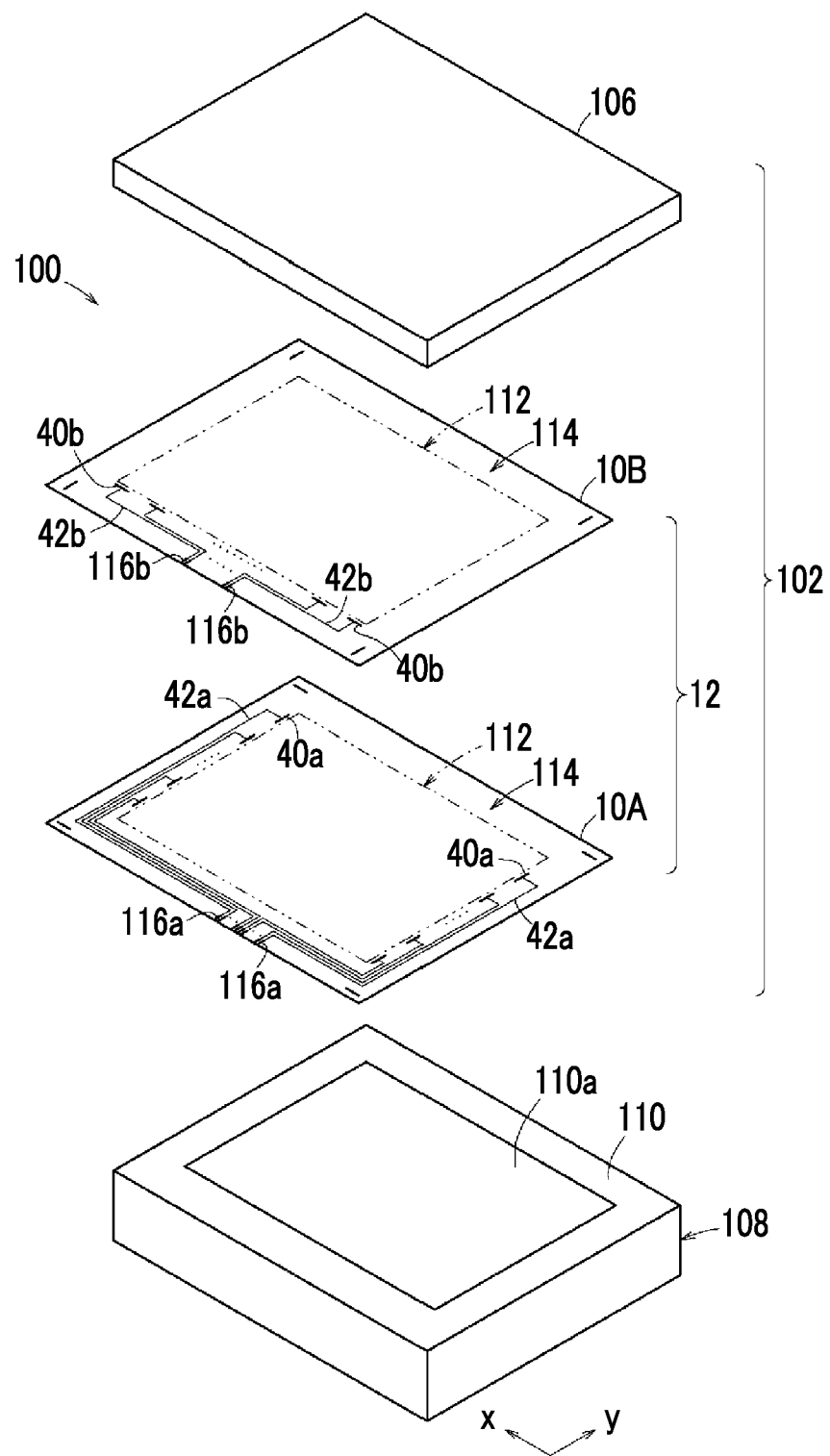
FIG. 1 is an exploded perspective view of a main part of a display device comprising a touch panel according to this embodiment.

FIG. 1 is an exploded perspective view of a main part of a display device 108 including a touch panel 100 according to this embodiment. First, the touch panel 100 will be described. The touch panel 100 has a sensor body 102 and a control circuit (IC circuit or the like) (not shown).

The sensor body 102 has a laminated conductive sheet (conductive sheet) 12 in which a first sheet body 10A and a second sheet body 10B are laminated in this order from the below, and a protective layer 106 laminated on the second sheet body 10B. That is, in the sensor body 102, the first sheet body 10A, the second sheet body 10B, and the protective layer 106 are laminated from the below.

The sensor body 102 (the laminated conductive sheet 12 and the protective layer 106 is disposed on a display panel 110 in the display device 108, and constitutes, for example, a liquid crystal display or the like. The sensor body 102 has a sensor portion 112 of a touch position disposed in a region corresponding to a display screen 110a of the display panel 110 when visually recognized from a top surface, and a terminal wiring portion 114 (so-called frame) disposed in a region corresponding to a peripheral portion of the display panel 110.

The laminated conductive sheet 12 will be described referring to FIGS. 2 and 3, in which a main part is enlarged.

The first sheet body 10A has lower electrodes 18A which are formed on one principal surface of a first transparent base 14A as an insulating layer. Similarly, the second sheet body 10B has upper electrodes 18B which are formed on one principal surface of an insulating second transparent base 14B. In FIGS. 2 and 3, although a form in which the transparent base as an insulating layer is disposed between the conductive films has been described, a configuration in which the conductive films are opposed to each other (a configuration in which a transparent adhesive is disposed as an insulating layer) may be made.

Although at least the lower electrode 18A or the upper electrode 18B, or both of the lower electrode 18A and the upper electrode 18B may be a mesh made of random cells, one of the lower electrode 18A and the upper electrode 18B may be a mesh made of random cells and the other electrode may be a mesh made of cells having the same shape (regular shape). In this embodiment, a case where the lower electrode 18A is a second mesh electrode made of cells having a regular shape and the upper electrode 18B is a first mesh electrode made of random cells will be described. The cells forming the lower electrode 18A as the second mesh electrode are referred to as "second cells", the cells forming the upper electrode 18B as the first mesh electrode are referred to as "first cells", and the second cells and the first cells are respectively represented by reference numerals 22A and 22B.

The thickness of the first transparent base 14A and the second transparent base 14B is preferably 20 μm to 350 μm or less, more preferably, 30 μm to 250 μm, and particularly preferably, 40 μm to 200 μm.

As the first transparent base 14A and the second transparent base 14B, a plastic film, a plastic plate, a glass plate, or the like can be considered.

As the material for the plastic film and the plastic plate, for example, polyesters, such as polyethylene telephthalate (PET) or polyethylene naphthalate (PEN); polyolefins, such as polyethylene (PE), polypropylene (PP), polystyrene, or polyethylene vinyl acetate (EVA); vinyls; polycarbonate (PC), polyamide, polyimide, acrylic resin, triacetylcellulose (TAC), cycloolefin polymer (COP), and the like are available. It is preferable that the transmittance of the first transparent base 14A and the second transparent base 14B is equal to or greater than 85%.

Figure 2:
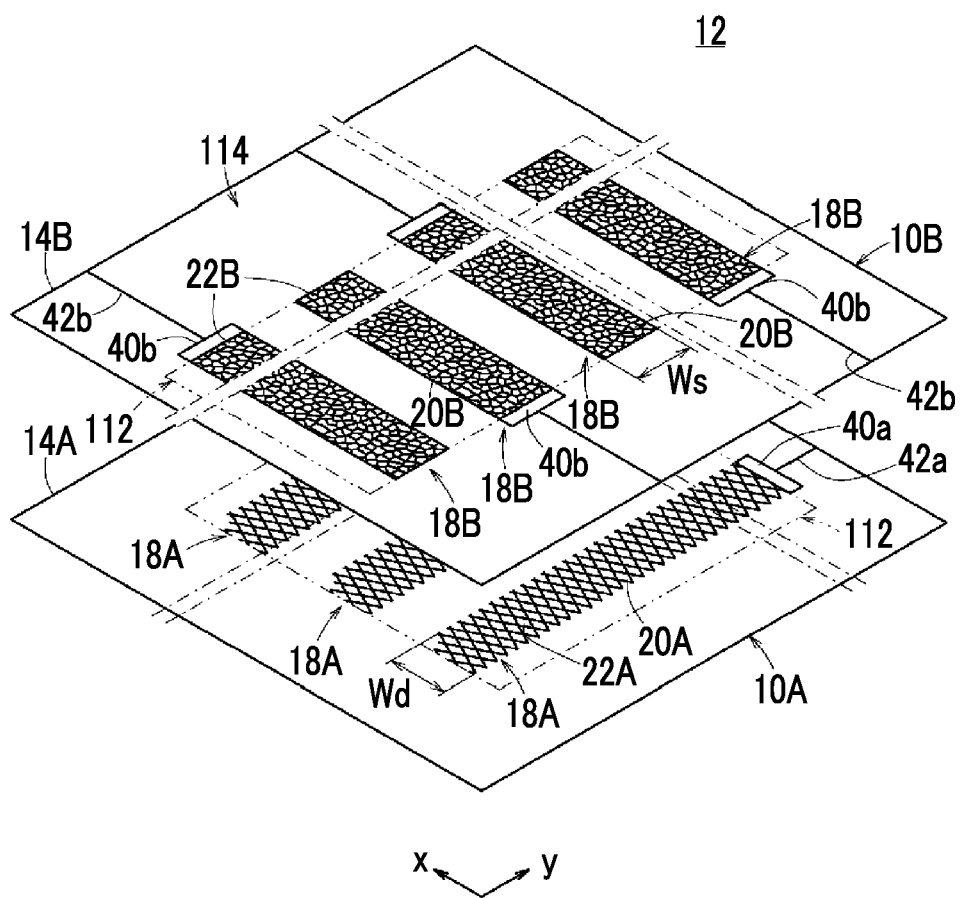
FIG. 2 is an exploded perspective view of a main part of a conductive sheet constituting the touch panel.

In a case of this embodiment, as shown in FIG. 2, the lower electrodes 18A have a plurality of band-like patterns extending in a first direction (y direction/longitudinal direction). A plurality of lower electrodes 18A have a predetermined with direction dimension (electrode width Wd) in a second direction (a direction orthogonal to the first direction: x direction), and are arranged in parallel in the x direction.

In FIG. 2, although a blank is provided between adjacent lower electrodes 18A, in order to prevent the lower electrodes 18A from being visually recognized, it is preferable that a dummy mesh is disposed between adjacent lower electrodes 18A. It is preferable that the dummy mesh uses cells having the same shape as the cells of the lower electrode formed on the same surface.

Each lower electrode 18A is formed by making thin wires 20A (metal wires) made of silver, copper, molybdenum, or an alloy containing one or more of them intersect each other. With the intersection, a plurality of spaces (openings) surrounded by the thin wire 20A, that is, second cells 22A, are formed.

In this case, the second cells 22A have the same shape. That is, the lower electrode 18A formed of the thin wires 20A is formed of a mesh with a plurality of linked second cells 22A, and has a so-called regular pattern.

Figure 4:
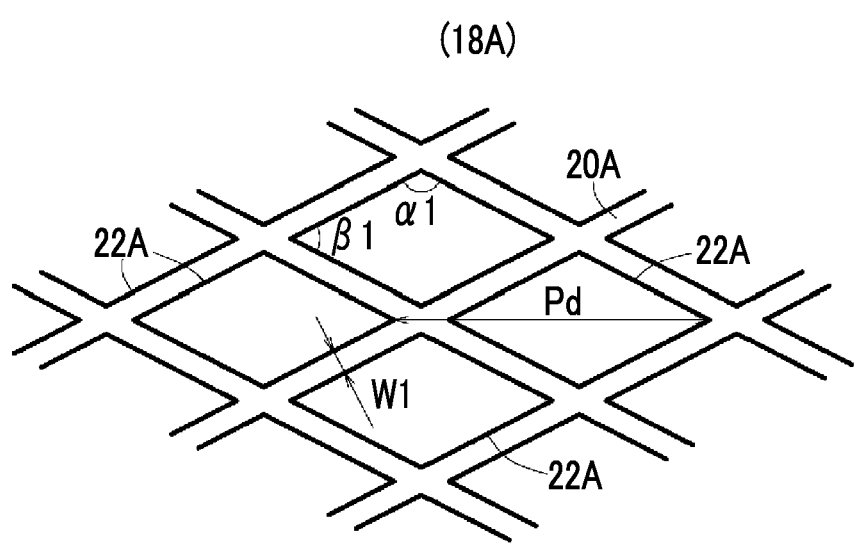
FIG. 4 is a schematic plan view showing an example of second cells forming a lower electrode formed in the conductive sheet.

The second cells 22A have, for example, a parallelogram shape, and typically, as illustrated in FIG. 4, has a diamond shape in which four sides have the same length. The second cells 22A illustrated in FIG. 4 have two obtuse angles and two acute angles. The intersection angles $\alpha 1$ of the obtuse angle in a diagonal relationship are the same angle greater than 90°, and the intersection angles $\beta 1$ of the acute angles are the same angle less than 90°.

It is preferable that the intersection angles $\beta 1$ as the acute angles are equal to or less than 70°. In this case, it is effective to reduce moire. However, even in a case where $\beta 1$ is excessively small, moire is likely to occur. In order to avoid the occurrence of moire, it is preferable that $\beta 1$ is in a range of 30° to 70°, and further, in a range of 45° to 70°.

The second cells 22A are not limited to the horizontally long diamond shape illustrated in FIG. 4, and may of course have a vertically long diamond shape. It is preferable that the angles are designed so as to suppress the occurrence of moire in the pixels of the display.

In the second cells 22A, the width direction dimension (line width W1) of the thin wires 20A is set to be preferably equal to or less than 10 μm, and more preferably, equal to or less than 5 μm. With this, moire of conductive patterns of the thin wire 20A and thin wire appearance are improved, and visibility is improved (that is, the thin wires 20A forming a mesh are made hard to be visually recognized). In order to secure conductivity necessary for the conductive sheet, it is preferable that the width direction dimension of the thin wires 20A is equal to or greater than 1 μm.

Although an example of the diamond shape is described in FIGS. 2 and 4, the second cells 22A may be random cells like the first cells 22B, or may be a regular pattern in a different polygonal shape, such as a hexagonal shape or a triangular shape. The second cells 22A preferably have a random shape or a diamond shape, and more preferably, have a diamond shape. Although the second mesh electrode made of the second cells 22A may be the upper electrode or the lower electrode, in a case where the cells having a diamond shape are used, the second mesh electrode preferably becomes the lower electrode.

As shown in FIG. 2, one end portion of each lower electrode 18A is electrically connected to a first terminal wiring pattern 42a through a first connection portion 40a.

As shown in FIG. 2, the upper electrodes 18B formed on one principal surface of the second transparent base 14B (see FIG. 3) constituting the second sheet body 10B have a plurality of band-like patterns extending in the second direction (x direction). A plurality of upper electrodes 18B are arranged in the first direction (y direction). That is, in the laminated conductive sheet 12, as shown in FIG. 3, the lower electrodes 18A and the upper electrodes 18B are opposed to each other through the insulating second transparent base 14B.

Similarly to the lower electrodes 18A, each upper electrode 18B is formed by making thin wires 20B intersect each other. With the intersection, spaces (openings) surrounded by the thin wires 20B, that is, first cells 22B, are formed.

Figure 5:
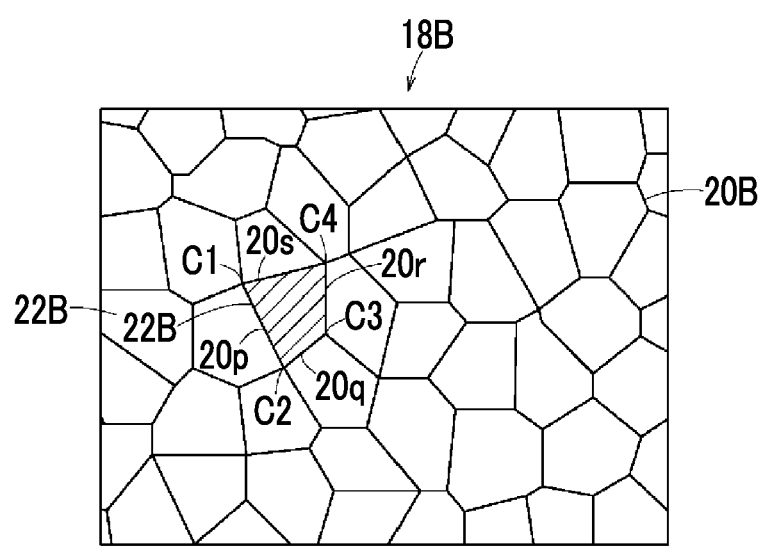
FIG. 5 is a schematic plan view showing an example of first cells forming an upper electrode formed in the conductive sheet.

An example of the first cell 22B is shown in FIG. 5. In this case, the hatched first cell 22B is formed by a thin wire 20p linearly connecting a vertex C1 and a vertex C2, a thin wire 20q linearly connecting the vertex C2 and a vertex C3, a thin wire 20r linearly connecting the vertex C3 and a vertex C4, and a thin wire 20s linearly connecting the vertex C4 and the vertex C1, and has a polygonal shape. Similarly, other cells (first cells 22B) have a polygonal shape. In summary, the upper electrode 18B has the first cells 22B having different shapes, and is a mesh made of cells having a random shape with low regularity (uniformity).

In the random pattern shown in FIG. 5, an average cell pitch (hereinafter, represented by "Ps" as necessary) is preferably 50 µm to 400 µm, and more preferably, 50 µm to 300 µm. The average cell pitch is defined as an average length obtained by measuring the maximum length of the first cell 22B in the extension direction of the electrode for arbitrary 30 cells.

The width direction dimension (line width) of the thin wires 20B is not particularly limited, can be set to be, for example, equal to or less than 10 µm, and preferably, equal to or less than 5 µm. With the combination of the first cells 22B having a random shape and the thin wires 20B having a small line width, moire is improved and visibility is improved. It is more preferable that the line width is equal to or less than 4 µm. In order to secure conductivity necessary for the conductive sheet, it is preferable that the line width of the thin wires 20B is equal to or greater than 1 µm.

The average cell pitch Ps of the upper electrode 18B is preferably set in a range greater than 50 µm and equal to or less than 3,200 µm, and greater than the average cell pitch Pd of the lower electrode 18A. Similarly to the upper electrode 18B, the average cell pitch Pd of the lower electrode 18A is defined as a calculated value by measuring the maximum length of the second cell 22A in the extension direction of the electrode and averaging the lengths of arbitrary 30 second cells 22A.

The average cell pitch Ps is greater than once or equal to or less than eight times the average cell pitch Pd. In summary, the following relational expression is established between the average cell pitch Ps and the average cell pitch Pd.

$1 < Ps/Pd \leq 8$

That is, for example, when the average cell pitch Pd of the second cells 22A is 100 µm, the average cell pitch Ps of the first cells 22B is set in a range greater than 100 µm and equal to or less than 800 µm. When the average cell pitch Pd of the second cells 22A is 250 µm, the average cell pitch Ps of the first cells 22B is set in a range greater than 250 µm and equal to or less than 2000 µm.

In this way, the average cell pitch Ps of the upper electrode 18B is made greater than the average cell pitch Pd of the lower electrode 18A within a predetermined range, whereby the amount of change in capacitance between before and after the press (touch) of the finger is increased compared to a case where Ps/Pd is 1, in other words, a case where the average cell pitch Pd of the second cells 22A and the average cell pitch Ps of the first cells 22B are equal to each other. This will be described below.

As shown in FIG. 2, one end portion of each upper electrode 18B is electrically connected to a second terminal wiring pattern 42b through a second connection portion 40b.

When the width direction dimension (electrode width) of the lower electrodes 18A in the x direction is Wd and the width direction dimension (electrode width) of the upper electrodes 18B in the y direction is Ws, Ws/Wd can be set to be equal to or greater than 0.5 and equal to or less than 1.5. That is, in this case, the electrode width Ws of the overlying upper electrodes 18B is not necessarily made smaller than the electrode width Wd of the underlying lower electrodes 18A, and in some cases, the electrode width Ws may be made equal to the electrode width Wd, or the electrode width Ws may be made greater than the electrode width Wd. Of course, the electrode width Ws may be made smaller than the electrode width Wd.

It is preferable that Ws/Wd is equal to or greater than 0.8 and equal to or less than 1.2. It is more preferable that the lower electrodes 18A and the upper electrodes 18B nearly have the same width since sensitivity in a vertical direction and sensitivity in a horizontal direction for a touch region are equal to each other.

It is preferable that the effective electrode area of the upper electrodes 18B configured as above is equal to or greater than 70% of an effective touch area. With this, it becomes easy to increase conductivity of the upper electrodes 18B. The effective electrode area indicates the ratio of an area covered by the upper electrodes 18B in a display region. Specifically, in FIG. 2, the effective electrode area is a value calculated by dividing the electrode width Ws of the upper electrodes 18B, the length of the sensor portion 112 in the y direction, and the number of upper electrodes 18B by the area of the sensor portion 112. In a case where there are dummy electrodes between adjacent upper electrodes 18B, the dummy electrodes are not included in the effective electrode area.

As shown in FIG. 2, in the first sheet body 10A applied to the touch panel 100, multiple lower electrodes 18A described above are arranged in a portion corresponding to the sensor portion 112, and the first terminal wiring patterns 42a extending from the respective first connection portions 40a are arranged in the terminal wiring portion 114.

In the example of FIG. 1, in a lengthwise central portion of a peripheral portion of the terminal wiring portions 114 on one long side (x direction) of the first sheet body 10A, a plurality of first terminals 116a are arranged in a length direction of the one long side. A plurality of first connection portions 40a connected to the lower electrodes 18A are arranged linearly along the short side (y direction) of the sensor portion 112. The first terminal wiring patterns 42a extending from the respective first connection portions 40a extends in the terminal wiring portion 114 of the first sheet body 10A and are electrically connected to the corresponding first terminals 116a.

The appearance of the second sheet body 10B has a rectangular shape when viewed from the top surface, and the appearance of the sensor portion 112 also has a rectangular shape. In a lengthwise central portion of a peripheral portion of the terminal wiring portion 114 on one long side (x direction) of the second sheet body 10B, a plurality of second terminals 116b are arranged in a length direction of the one long side. A plurality of second connection portions 40b connected to the upper electrodes 18B are arranged linearly along one long side of the sensor portion 112. The second terminal wiring patterns 42b extending from the respective second connection portions 40b extend toward the substantially central portion on one long side of the second sheet body 10B, and are respectively electrically connected to the corresponding second terminals 116b.

The manner in which the first terminal wiring patterns 42a extend may be the same as the second terminal wiring patterns 42b described above, and conversely, the manner in which the second terminal wiring patterns 42b extend may be the same as the first terminal wiring patterns 42a described above.

Figure 3:
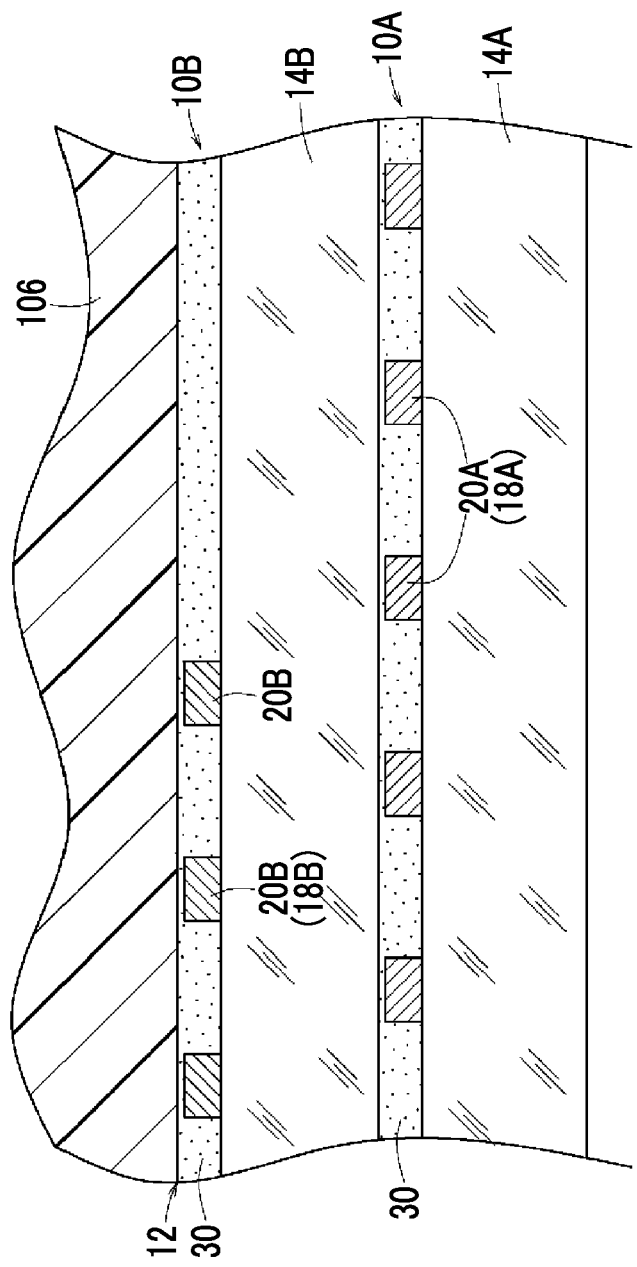
FIG. 3 is a schematic longitudinal sectional view of the conductive sheet.

As shown in FIG. 3, the laminated conductive sheet 12 has a configuration in which the second sheet body 10B is laminated on the first sheet body 10A. At this time, an adhesive (also referred to as OCA) 30 which is bonded as an adhesive sheet may be disposed between an upper end surface (that is, on the lower electrodes 18A and the first transparent base 14A) of the first sheet body 10A and a lower end surface of the second sheet body 10B.

Figure 6:
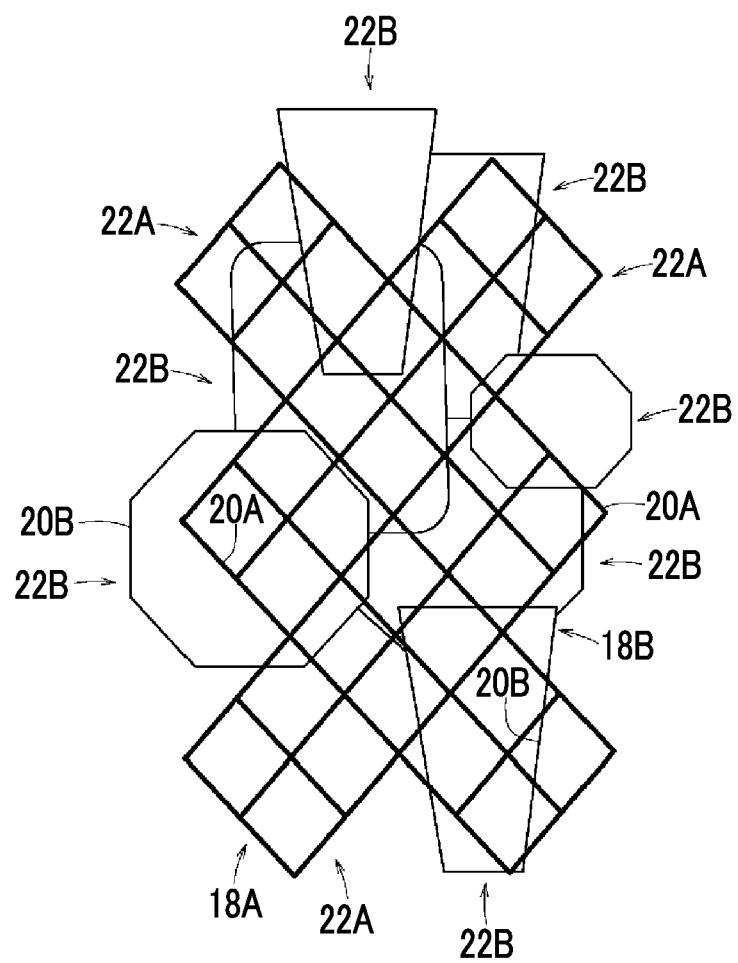
FIG. 6 is a schematic plan view showing an overlapping portion of a lower electrode and an upper electrode.

In the laminated conductive sheet 12 formed in this way, an example of a place (overlapping portion) where the lower electrode 18A overlaps the upper electrode 18B is shown in FIG. 6 as a plan view. Thick solid lines in FIG. 6 are the second cells 22A (small pitch) of the lower electrode 18A (regular mesh pattern), and thin solid lines are the first cells 22B (large pitch) of the upper electrode 18B (random mesh pattern).

In a case where the laminated conductive sheet 12 including the lower electrodes 18A and the upper electrodes 18B configured as above is used as the touch panel 100, a protective layer 106 may be formed on the second sheet body 10B. It is preferable that the adhesive (OCA) 30 as an adhesive sheet is disposed between an upper end surface of the second sheet body 10B and a lower end surface of the protective layer 106. The first terminal wiring patterns 42a extending from the multiple lower electrodes 18A of the first sheet body 10A and the second terminal wiring patterns 42b extending from the multiple upper electrodes 18B of the second sheet body 10B are connected to, for example, a control circuit which controls scanning.

In order to a pattern having a narrow line width, the lower electrodes 18A and the upper electrodes 18B can be preferably formed by etching using a photolithography process, a micro-contact printing patterning method, or a silver salt method. In order to repeatedly obtain a large number of patterns, a silver salt method is more preferably used.

The micro-contact printing patterning method is a method which obtains a pattern having a narrow line width using a micro-contact printing method. The micro-contact printing method is a method which uses an elastic polydimethylsiloxane stamp and brings a thiol solution into contact with a gold substrate as ink to produce a monolayer pattern (see Whitesedes, Angew. Chem. Int. Ed., 1998, Vol. 37, pp. 550).

A representative process of the micro-contact printing patterning method is, for example, as follows. That is, first, a metal is coated on a substrate (for example, silver is sputter-coated on a PET substrate).

Next, monolayer masking is stamped on the metal-coated substrate using the micro-contact printing method. Thereafter, the metal coated on the substrate is removed by etching except for the pattern under the masking.

In regard to the above, a specific operation and the like are described in detail in the paragraph <0104> of JP2012-519329A.

The silver salt method exposes and develops a photosensitive material having a photosensitive silver salt containing layer to obtain the thin wires 20A or 20B forming the mesh. A specific operation and the like are described in detail in the paragraphs <0163> to <0241> of JP2009-004348A.

The invention is not particularly limited to the embodiment described above, and various changes may be made without departing from the spirit of the invention.

For example, as described above, both of the lower electrode 18A and the upper electrode 18B may be made of a random mesh pattern. It is preferable that either the lower electrode 18A or the upper electrode 18B is made of a random mesh pattern, and the other electrode is made of a regular mesh pattern.

Although the lower electrode 18A may be made of a random mesh pattern and the upper electrode 18B may be made of a regular mesh pattern, it is most preferable that the lower electrode 18A is made of a regular mesh pattern and the upper electrode 18B is made of a random mesh pattern. The reason is because a random mesh has thin wires arranged randomly, and accordingly, wasteful line segments small in contribution to conductivity compared to a regular pattern are generated. For this reason, in a random mesh, transmittance tends to be slightly lowered compared to a regular mesh having the nearly same conductivity. Therefore, it is most preferable that a regular mesh pattern with less waste is used in the lower electrode having a small average cell pitch and a random mesh pattern is used in the upper electrode having a large average cell pitch.

In both cases, the average cell pitch Ps of the upper electrode 18B is greater than the average cell pitch Pd of the lower electrode 18A and is in a range greater than 1 and equal to or less than 8 (preferably, 2 to 6).

Figure 7:
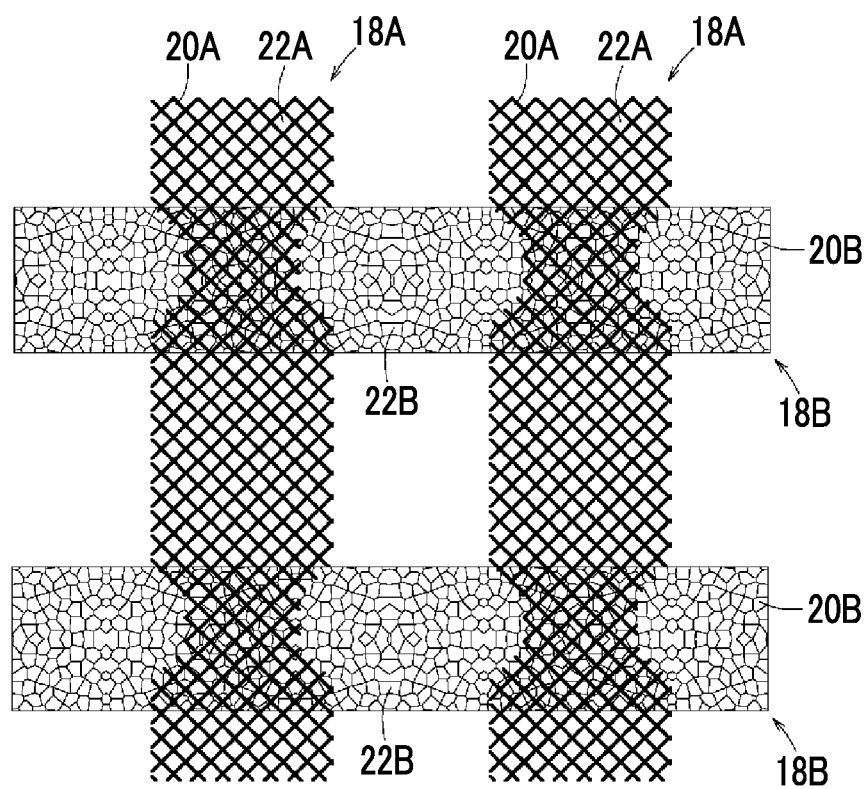
FIG. 7 is a schematic plan view when a lower electrode having a small electrode width part and an upper electrode having a constant electrode width overlap each other.

In the embodiment described above, although the electrode widths Ws and Wd are constant (see FIG. 2), as shown in FIG. 7, for example, the electrode width of a part of the lower electrode 18A may be narrowed in the middle of extending in the longitudinal direction. In this case, a part having a small electrode width may be disposed above the upper electrode 18B.

In contrast to FIG. 7, the electrode width of a part of the lower electrode 18A may be decreased. In this case, the upper electrode 18B may be disposed above a part having a small electrode width. In regards to both of the lower electrode 18A and the upper electrode 18B, a part of the electrode width may be decreased in the middle of extending in the longitudinal direction, and parts having a small electrode width may be disposed in a laminated manner.

In this case, the initial value of capacitance at the places where the lower electrode 18A and the upper electrode 18B are opposed to each other becomes small. Therefore, it is possible to achieve improvement of the S/N ratio.

It is preferable that a part of the thin wires of the second cells 22A (lower electrode 18A) at the places which will be originally opposed to the first cells 22B (upper electrode 18B) are reduced in line width or become a disconnection portion. In other words, a narrow width portion or a disconnection portion may be provided at the places of the thin wires 20A forming the lower electrode 18A opposed to the upper electrode 18B. Of course, in contrast, a part of the intersection places of the thin wires 20B forming the upper electrode 18B to the lower electrode 18A may be disconnected.

In this case, parasitic capacitance becomes small in the disconnection portion. That is, the initial value of capacitance becomes small. In a case where the initial value of capacitance is large, when capacitance changes with the press of the finger by the operator, it is not easy to improve the S/N ratio; however, it is designed to decrease the opposing area at the places where the lower electrode 18A and the upper electrode 18B are opposed to each other, whereby it is possible to achieve improvement of the S/N ratio.

Figure 8:
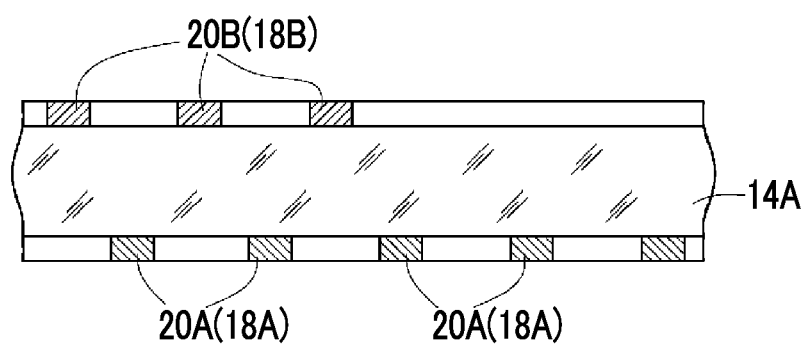
FIG. 8 is a schematic longitudinal sectional view of a conductive sheet according to an embodiment different from FIG. 3.

The laminated conductive sheet 12 is not limited to a laminated conductive sheet in which the lower electrodes 18A are formed on one principal surface of the first transparent base 14A, the upper electrodes 18B are formed on one principal surface of the second transparent base 14B, and the first transparent base 14A and the second transparent base 14B are laminated (see FIGS. 2 and 3). That is, as shown in FIG. 8, the lower electrodes 18A may be formed on one principal surface of the first transparent base 14A, and the upper electrodes 18B may be formed on the other principal surface of the first transparent base 14A. In this case, a form is made in which the second transparent base 14B is not provided, the first transparent base 14A is laminated on the lower electrodes 18A, and the upper electrodes 18B are laminated on the first transparent base 14A.

In all cases, the use of the laminated conductive sheet 12 is not particularly limited to the sensor body 102 of the touch panel 100, and can be used for various electrodes of an inorganic EL element, an organic EL element, or a solar cell. The laminated conductive sheet 12 can also be applied to a transparent heating element (for example, a defroster of a vehicle) which generates heat when a current flows, and an electromagnetic shielding material which shields electromagnetic waves, in addition to the electrodes.

EXAMPLE 1

A conductive sheet in which one lower electrode 18A having an electrode width Wd of 5 mm and an average cell pitch Pd of 300 μm is formed on a transparent base and a conductive sheet in which one upper electrode 18B having an electrode width Ws of 5 mm is formed on a transparent base are bonded to each other through an OCA to obtain electrode laminate. Of course, the lower electrode and the upper electrode are partially opposed to each other.

In this configuration, the average cell pitch Ps of the upper electrode is varied as shown in Table 1, and electrode laminates of Examples 1 to 7 and Comparative Examples 1 and 2 are constituted. Thereafter, the amount (ΔCm value) of change in capacitance between before and after touch in each electrode laminate is determined. When the value of ΔCm is large, the possibility of detecting touch is increased, and detection accuracy is improved.

TABLE 1

| | Electrode Average Cell Pitch (μm) | | | | |
|---|---|---|---|---|---|
| | Lower Electrode (Pd) | Upper Electrode (Ps) | Ps/Pd | ΔCm Value | Moire Evaluation |
| Comparative Example 1 | 300 | 300 | 1 | 0.68 | A |
| Example 1 | 300 | 450 | 1.5 | 0.8 | A |
| Example 2 | 300 | 600 | 2 | 0.91 | A |

TABLE 1-continued

| | Electrode Average Cell Pitch (μm) | | | | |
|---|---|---|---|---|---|
| | Lower Electrode (Pd) | Upper Electrode (Ps) | Ps/Pd | ΔCm Value | Moire Evaluation |
| Example 3 | 300 | 750 | 2.5 | 0.96 | A |
| Example 4 | 300 | 900 | 3 | 1 | A |
| Example 5 | 300 | 1200 | 4 | 0.98 | A |
| Example 6 | 300 | 1800 | 6 | 0.89 | A |
| Example 7 | 300 | 2400 | 8 | 0.73 | A |
| Comparative Example 2 | 300 | 3000 | 10 | 0.65 | A |

Figure 9:
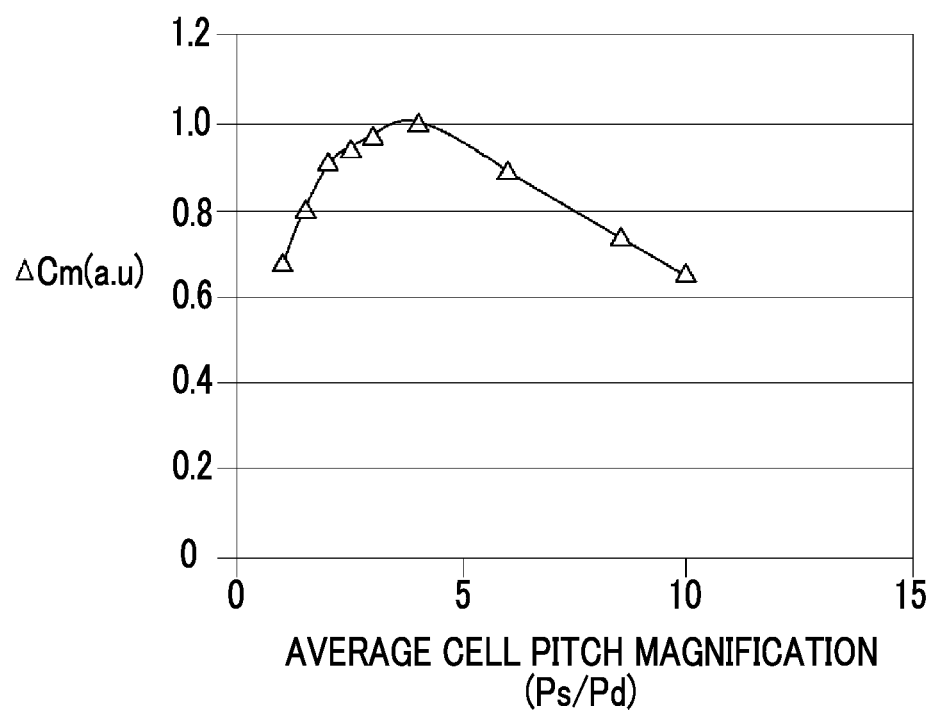
FIG. 9 is a graph showing the relationship between Ps/Pd which is the ratio between an average cell pitch Pd of an upper electrode and an average cell pitch Ps of an upper electrode and the amount of change in capacitance between before and after the press of a finger.

A result is shown in FIG. 9 as a graph in which the horizontal axis is Ps/Pd (average cell pitch magnification) and the vertical axis is ΔCm. From FIG. 9, it is understood that, if Ps/Pd is in a range greater than 1 and equal to or less than 8, ΔCm is improved compared to when Ps/Pd=1 (Comparative Example 1). In particular, in a case where Ps/Pd is 2 to 6, in other words, when the average cell pitch Ps of the first cells 22B (upper electrode 18B) is two times or six times the average cell pitch Pd of the second cells 22A (lower electrode 18A), the effect is remarkable. This means that the SN ratio, and consequently, touch detection accuracy can be improved.

The reason is because, when the average cell pitch Ps is made greater than the average cell pitch Pd, an electric field from the mesh of the lower electrode 18A toward the mesh of the upper electrode 18B easily passes through the openings of the cells of the upper electrode 18B, and for this reason, the amount of change in capacitance between before and after the press of the finger is increased. Therefore, it is possible to improve touch detection accuracy without decreasing the electrode width Ws of the upper electrode 18B.

As a reason that Ps/Pd is decreasing after peaking in the vicinity of 3, it is considered that, when the average cell pitch Ps of the upper electrode becomes large, since the lower electrode positioned near the center of the opening of the upper electrode is distant from the upper electrode, the effect of an electric field from the lower electrode on the upper electrode is reduced, and thus, the contribution to the ΔCm value is small. Accordingly, the average cell pitch Ps of the upper electrode is not necessarily so large, and has a preferable range.

In Table 1, moire evaluation of the electrode laminates of Examples 1 to 7 and Comparative Examples 1 and 2 is shown together. In Table 1, "A" indicates that moire is not recognized even if an evaluator carefully confirms. From Table 1, when Ps/Pd is greater than 1 and equal to or less than 8, as will be apparent with reference to more evaluation when Ps/Pd=1.5 and Ps/Pd=2.5 (Examples 1 and 3), it is understood that moire is not generated even in a case where Ps/Pd is not a natural number.

This is because one electrode is made of random cells, and accordingly, the occurrence of moire (periodic interference) due to the difference between the pitches of the upper electrode and the lower electrode is suppressed. In a case where both of the upper electrode and the lower electrode are made of a regular pattern in a diamond shape or the like, since the coarse and dense patterns of interference are generated periodically due to the difference between the pitches, and strong moire is visually recognized, available Ps/Pd is not strictly limited. In contrast, in a case where a mesh having random cells is used, Ps/Pd can be set to any value if the value is in a range greater than 1 and equal to or less than 8. For this reason, the degree of freedom of design is increased.

From the above, Ps/Pd is set in a range greater than 1 and equal to or less than 8, and more preferably, in a range of 2 to 6, whereby it is possible to reduce moire and to increase touch detection accuracy in the touch panel 100 (display device 108).

In addition, since it is not necessary to make the electrode width Ws of the upper electrode 18B extremely small, it is not necessary to make the average cell pitch of the first cells 22B small. For this reason, since it is possible to avoid a decrease in the transmittance of the upper electrode 18B, the transmittance of the second electrode 18B is improved.

EXPLANATION OF REFERENCES

- 10A: first sheet body
- 10B: second sheet body
- 12: laminated conductive sheet (conductive sheet)
- 14A: first transparent base
- 14B: second transparent base
- 18A: lower electrode
- 18B: upper electrode
- 20A, 20B: thin wire
- 22A: second cell
- 22B: first cell
- 30: adhesive (OCA)
- 100: touch panel
- 102: sensor body
- 106: protective layer
- 108: display device
- 110: display panel
- 112: sensor portion
- 114: terminal wiring portion

What is claimed is:

1. A conductive sheet comprises:
a lower electrode and an upper electrode which are laminated with an insulating layer interposed therebetween,
wherein either one of the lower electrode or the upper electrode has a first mesh electrode with a plurality of linked first cells formed by making metal wires intersecting each other,
the plurality of first cells being random cells having different shapes, and
a plurality of first mesh electrodes extending in a first direction and being arranged in parallel to a second direction orthogonal to the first direction,
the other electrode of the upper electrode and the lower electrode has a second mesh electrode with a plurality of linked second cells formed by making metal wires intersecting each other,
a plurality of second mesh electrodes extending in the second direction and being arranged in parallel to the first direction, and
when the average cell pitch of the lower electrode is Pd and the average cell pitch of the upper electrode is Ps, Ps/Pd greater than 1 and equal to or less than 8, and
wherein the average cell pitch Pd of the lower electrode is equal to or greater than 50 μm and equal to or less than 400 μm, and the average cell pitch Ps of the upper electrode is greater than 50 μm and equal to or less than 3,200 μm.

2. The conductive sheet according to claim 1, wherein Ps/Pd is equal to or greater than 2 and equal to or less than 6.

3. The conductive sheet according to claim 1, wherein an effective electrode area of the upper electrode is equal to or greater than 70% of an effective touch area of the upper electrode.

4. The conductive sheet according to claim 2, wherein an effective electrode area of the upper electrode is equal to or greater than 70% of an effective touch area of the upper electrode.

5. The conductive sheet according to claim 1, wherein, when the electrode width of the lower electrode is Wd and the electrode width of the upper electrode is Ws, Ws/Wd is equal to or greater than 0.5 and equal to or less than 1.5.

6. The conductive sheet according to claim 2, wherein, when the electrode width of the lower electrode is Wd and the electrode width of the upper electrode is Ws, Ws/Wd is equal to or greater than 0.5 and equal to or less than 1.5.

7. The conductive sheet according to claim 3, wherein, when the electrode width of the lower electrode is Wd and the electrode width of the upper electrode is Ws, Ws/Wd is equal to or greater than 0.5 and equal to or less than 1.5.

8. The conductive sheet according to claim 1, wherein the second cells have a diamond shape.

9. The conductive sheet according to claim 2, wherein the second cells have a diamond shape.

10. The conductive sheet according to claim 3, wherein the second cells have a diamond shape.

11. The conductive sheet according to claim 1, wherein the first mesh electrode is the upper electrode.

12. The conductive sheet according to claim 2, wherein the first mesh electrode is the upper electrode.

13. The conductive sheet according to claim 1, wherein, at opposing places of the lower electrode and the upper electrode, the electrode width of at least the lower electrode or the upper electrode is set to be smaller than parts other than the opposing places.

14. The conductive sheet according to claim 2, wherein, at opposing places of the lower electrode and the upper electrode, the electrode width of at least the lower electrode or the upper electrode is set to be smaller than parts other than the opposing places.

15. The conductive sheet according to claim 1, wherein a disconnection portion in which at least the metal wires forming the first cells or the metal wires forming the second cells are disconnected is provided at a part of opposing places of the lower electrode and the upper electrode.

16. The conductive sheet according to claim 2, wherein a disconnection portion in which at least the metal wires forming the first cells or the metal wires forming the second cells are disconnected is provided at a part of opposing places of the lower electrode and the upper electrode.

17. A capacitive touch panel comprising:
the conductive sheet according to claim 1.

18. A display device comprising:
the capacitive touch panel according to claim 17.

19. The conductive sheet according to claim 1, wherein the second cells have the same shape.

20. The conductive sheet according to claim 1, wherein the upper electrode is the first mesh electrode, and
the lower electrode is the second mesh electrode, the second cells having the same shape.

21. A conductive sheet comprises:
a lower electrode and an upper electrode which are laminated with an insulating layer interposed therebetween,
wherein either one of the lower electrode or the upper electrode has a first mesh electrode with a plurality of linked first cells formed by making metal wires intersecting each other,
the plurality of first cells being random cells having different shapes, and
a plurality of first mesh electrodes extending in a first direction and being arranged in parallel to a second direction orthogonal to the first direction,
the other electrode of the upper electrode and the lower electrode has a second mesh electrode with a plurality of linked second cells formed by making metal wires intersecting each other,
a plurality of second mesh electrodes extending in the second direction and being arranged in parallel to the first direction, and
when the average cell pitch of the lower electrode is Pd and the average cell pitch of the upper electrode is Ps, Ps/Pd is greater than 1 and equal to or less than 8, and
wherein, when the electrode width of the lower electrode is Wd and the electrode width of the upper electrode is Ws, Ws/Wd is equal to or greater than 0.5 and equal to or less than 1.5.

* * * * *